Figure 1:
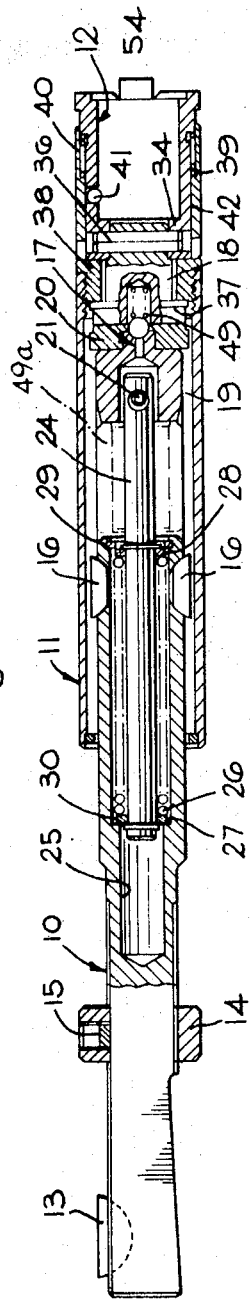

United States Patent [19]
Eaves et al.

[11] 3,764,152
[45] Oct. 9, 1973

[54] FLOATING CHUCKS
[75] Inventors: Dennis Robert Eaves; Horst Bergemann, both of Friars Cliff, Christchurch, Hampshire, BH23 4DZ, England
[73] Assignee: Bishop Eaves & Sons Limited, Dorset, England
[22] Filed: Nov. 18, 1971
[21] Appl. No.: 199,858

[52] U.S. Cl................................. 279/16, 408/239
[51] Int. Cl.............................................. B23q 3/00
[58] Field of Search..................... 279/16; 408/238, 408/139, 140, 239; 10/89 F, 107 F, 141 H, 129 R

[56] References Cited
UNITED STATES PATENTS
2,475,386   7/1949   Frisco.................................. 279/16
2,778,647   1/1957   Benjamin et al..................... 279/16
3,649,129   3/1972   King.................................... 408/139

Primary Examiner—Francis S. Husar
Attorney—George H. Spencer et al.

[57] ABSTRACT

A chuck which includes a tool holding unit and a body having means whereby it can be driven by a driving element and can telescope realtive thereto and having means for transmitting drives to the tool holding unit, characterised in that :
a. the driving element is a shank which has a sliding key connection within the body and that the shank telescopes relative to the body under the action of biasing means housed entirely within an axial bore in the shank and
b. the means for transmitting drives to the tool holding unit includes a compound slide unit comprising a plurality of interfitting elements having tongue and groove driving connections and arranged in such a way as to permit limited radial movement of the tool holding unit relative to the driving shank in a pair of mutually transverse directions.

8 Claims, 7 Drawing Figures

FLOATING CHUCKS

This invention relates to chucks such as are used for holding cutting tools, for example, tapping chucks.

In a multi-spindle machine tool used to perform simultaneously a number of cutting operations on a workpiece, the closest spacing obtainable between adjacent cutting tools is limited, inter alia, by the dimensions of the chucks holding the tools. It is advantageous that chucks, especially tapping chucks, should have facilities for allowing both radial and axial movement of the cutting tools held thereby relative to the direction of feed to avoid breakage of the cutting tools if, for example, the axis along which a tap is fed towards a workpiece does not coincide exactly with the axis of a bore in which a tapping operation is to be effected.

It is an object of the present invention to provide an improved form of chuck, particularly one which is constructed in such a way that, in multi-spindle applications, the cutting tool can be spaced relatively closely to one another and a further object of the invention is to provide an improved tapping chuck having facilities for allowing both radial and axial movement of a tap held therein relative to the direction of feed movement.

According to the present invention there is provided a chuck which includes a tool holding unit and a body having means whereby it can be driven by a driving element and can telescope relative thereto and having means for transmitting drives to the tool holding unit, characterised in that:

a. the driving element is a shank which has a sliding key connection within the body and that the shank telescopes relative to the body under the action of biasing means housed entirely within an axial bore in the shank and b. the means for transmitting drives to the tool holding unit includes a compound slide unit comprising a plurality of interfitting elements having tongue and groove driving connections and arranged in such a way as to permit limited radial movement of the tool holding unit relative to the driving shank in a pair of mutually transverse directions.

The elements constituting the compound slide unit are preferably housed entirely within the body and there are preferably three elements, a first element drivingly connected to the tool holding unit, a second element which is drivingly connected to the body and a third element intermediate the first and second elements and receiving a formation projecting axially from the second element in a recess in said third element, the projecting formation affording a seat for a spring-loaded ball for locating the second element relative to the first element.

The third element preferably has a pair of mutually orthogonal radial grooves formed therein, one groove receiving a tongue formation on the first element and the other groove constituting said recess and receiving a tongue constituting said projecting formation on the second element, the arrangement being such as to permit said limited radial movements of the tool holding unit.

The biasing means is preferably a compression spring carried by an axially extending spindle connected to the second element of the compound slide unit, the spindle being received within the axial bore of the shank, the spring being arranged to bear against abutments formed within the shank and the arrangement being double-acting in that the spring is subject to compression regardless of the axial direction in which relative movement takes place between the spindle and shank.

Figure 2:
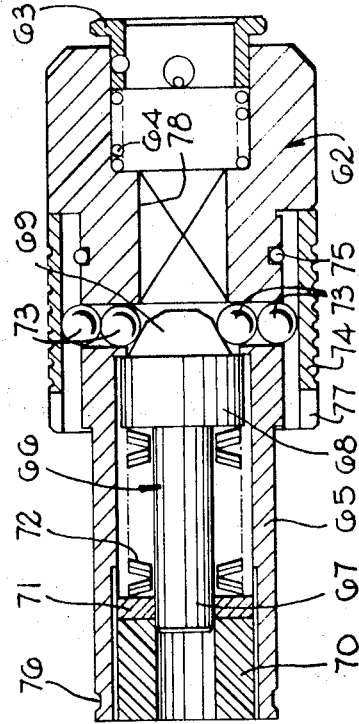
Figure 3:
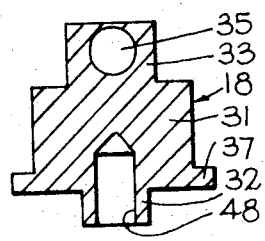
Figure 4:
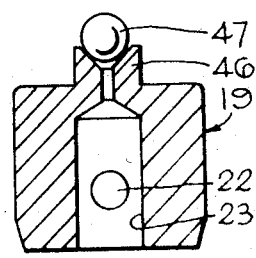
Figure 5:
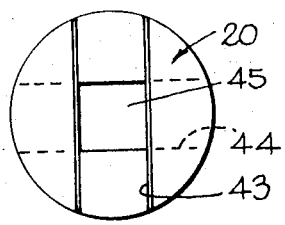
Figure 6:
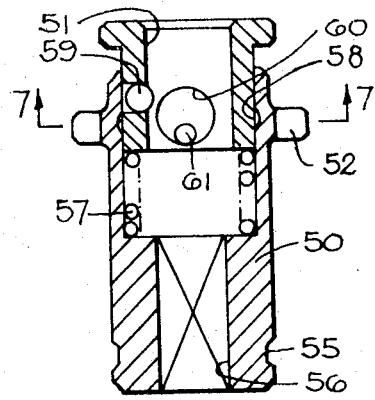
Figure 7:
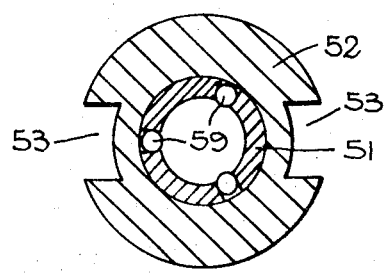

The invention will now be described by way of example with reference to the accompanying drawings in which :

FIG. 1 is a longitudinal sectional view of a tapping chuck,

FIG. 2 is a longitudinal sectional view of an adaptor including a torque-limiting clutch for use with the chuck shown in FIG. 1, FIGS. 3 and 4 are sectional views of two parts of a compound slide unit contained within the chuck, FIG. 5 is a plan view of a further part of the compound slide unit, FIG. 6 is a longitudinal sectional view of an alternative form of adaptor which may be used in some cases instead of that shown in FIG. 2 and FIG. 7 is a sectional view along the line 7—7 of FIG. 6.

As shown in FIG. 1, a tapping chuck includes a driving shank 10, a generally cylindrical body 11 and a tool holding unit 12. The driving shank 10 is received in use in an axial bore in the drive spindle of, for example, a vertical drilling machine and the shank 10 is provided with a keyway which receives a key 13 whereby the driving shank 10 can be made rotatably fast with the drive spindle. An adjuster nut 14 threadly engages the shank 10 to permit axial movement of the shank 10 relative to the drive spindle and a grub screw 15 threadedly engages in a radial bore in the adjuster nut 14 so that the shank 10 can be locked in the desired axial position relative to the drive spindle.

The driving shank 10 telescopes within the body 11 and a pair of keys are secured to the shank 10 and engage in diametrically opposed keyways formed in the inner surface of the body 11 so that rotational drive can be transmitted by the shank from the drive spindle of the drilling machine to the body 11. Rotational drive is transmitted from the body 11 to the tool holding unit 12 through a compound slide unit 17 which is housed entirely within the body 12 and which includes three elements 18, 19 and 20 shown respectively in FIGS. 3, 4 and 5. Element 19 of the compound slide unit is a primary drive plug which is drivingly connected to the body 11 by a diametrically extending pin 21 which is secured at each end thereof to the body 11 and extends through a diametrical through-bore 22 formed in the primary drive plug 19. The primary drive plug 19 has an axial bore 23 therein which receives one end of a spindle 24, the spindle 24 having a radial through-bore which is aligned with the diametrical through-bore 22 formed in the drive plug 19 to receive the pin 21.

The spindle 24 extends axially into an axial blind bore 25 in the driving shank 10 and carries a compression spring 26 whose ends bear against washers 27 and 28 encircling the spindle 24. The washer 28 abuts an annular locking element 29 fitted within the bore 25 of the shank 10 and the washer 27 abuts a shoulder 30 provided within the bore 25, the arrangement being such that the compression spring 26 is accommodated entirely within the axial bore 25 in the driving shank 10.

Element 18 of the compound slide unit shown in FIG. 3 includes a cylindrical portion 31 from one face of which projects a diametrically-extending tongue formation 32. A circular spigot 33 projects axially from the other face of the cylindrical portion 31 and is received in a socket in the base 34 of the tool holding unit 12. A skirt projects from the base 34 of the tool holding unit 12 and is formed with a pair of diametrically opposed through-bores which are aligned with a transversely extending through-bore 35 in the spigot 33 and a spring pin 36 passes through the aligned through-bores as shown in FIG. 1 to connect element 18 of the compound slide unit to the tool holding unit 12. A peripheral flange 37 projects radially of the cylindrical portion 31 of element 18 and abuts an annular ring 38 which has threaded engagement in the end of the body 11 adjacent the tool holding unit 12 and the internal diameter of the ring 38 is larger than the maximum diametrical dimension of the cylindrical portion 31 so as to afford a clearance between the annular ring 38 and element 18 of the compound slide unit.

The main portion of the tool holding unit 12 is of generally cylindrical form and is encircled by a locking sleeve 39 which is spring loaded by a compression spring 40 acting between an external shoulder on the main portion of the tool holding unit 12 and an internal shoulder formed within the sleeve 39, the sleeve 39 being thus urged into abutment with the annular ring 38.

The cylindrical wall of the main portion of the tool holding unit 12 is formed with a number of circumferentially spaced through bores in each of which a ball 41 is received, the diameter of each ball being greater than the thickness of the cylindrical wall of the tall holding unit 12. The balls 41 are arranged so that they are urged radially inwardly by the locking sleeve 39 when this is in the position shown in FIG. 1, the bores which receive the balls 41 being of reducing diameter in the radially inward direction to limit the extent of radial inward movement of the balls 41. The locking sleeve 39 has a circumferential groove 42 in the inner surface thereof with the groove 42 arranged so that, when the locking sleeve 39 is moved to the right as viewed in FIG. 1, the groove 42 can be aligned with the balls in 41 to enable the balls 41 to be displaced radially outwardly.

The tongue 32 of element 18 of the compound slide unit is received in a groove 43 formed in element 20 of the compound slide unit, element 20 being of disc-like form with the diametrically extending groove 43 formed in one face thereof and with a second diametrically extending groove formed in the other face thereof and extending at right angles to the groove 43. The two grooves 43 and 44 communicate through a square aperture 45 at the centre of element 20. Groove 44 of element 20 receives a tongue 46 projecting from the primary drive plug 19 and tongue 46 is recessed so as to afford a seat for a ball 47 which is located within the aperture 45 in element 20 and is partly received within an axial blind bore 48 formed in element 18 of the compound slide unit. As shown in FIG. 1 a helical compression spring 49 is accommodated within the slide bore 48 and bears against the ball 47, the engagement of the ball with the two elements 18 and 19 serving to centre them relative to each other.

As mentioned above the driving shank 10 is rotatably fast with the drive spindle of a drilling machine through the keyed connection at 13 and the body 11 is rotatably fast with the shank 10 through the keys 16. Drive is transmitted from the body 11 to the primary drive plug 19 by the pin 21 and drive is transmitted from the primary drive plug 19 to the secondary drive plug 18 through the tongue and groove connections which the two elements 18 and 19 have with the intermediate element 20. Rotational drive is transmitted from the secondary drive plug 18 to the tool holding unit 12 by the spring pin 36. The radial dimensions of the flange 37 of element 18 and of the intermediate element 20 are such as to afford a clearance between the outer peripheries of elements 18 and 20 and the inner surface of the body 11 and this clearance, together with the clearance between the cylindrical portion 31 and the inner surface of the annular ring 38 enables a compound sliding action to take place between the elements 18, 19 and 20 whereby radial movement of the tool holding unit relative to the driving shank 10 is permitted. This radial movement may be either in the direction of the groove 43 or in the direction of the groove 44 or in both directions dependent on the mode of relative movement between the elements 18, 19 and 20.

The keyed connection between the driving shank 10 and the body 11 is such as to permit the driving shank 10 to telescope relative to the body 11 under the action of the compression spring 26 and the arrangement is such that the spring 26 is under compression regardless of the direction of relative movement between the shank 10 and the body 11. Where desired, however, the arrangement can be made single-acting by introducing a spacing element 49a shown in chain dot in FIG. 1 between element 19 and the end of the shank 10 so that, as viewed in FIG. 1, the shank 10 can only move to the left relative to the body 12.

In FIGS. 6 and 7 there is shown a tool adaptor which comprises a generally cylindrical outer member 50 which can be inserted into the tool holding unit 12 of the chuck and there is an annular inner member 51 which is received as a close sliding set in an axial bore formed in the outer member 50. The outer member 50 is formed with a radially extending flange 52 which, as shown most clearly in FIG. 7, has a pair of diametrically opposed gaps 53. The tool holding unit 12 has a pair of diametrically opposed projecting lugs 54 formed integrally with the cylindrical wall thereof and when, the adaptor is inserted into the tool holding unit 12, the lugs 54 enter the gaps 53 to provide a driving connection between the tool holding unit and the adaptor. A circumferentially extending groove 55 is formed in the outer surface of the outer member adjacent the end thereof remote from the flange 52 and the spacing between the groove 55 and the flange 52 is such that, when the adaptor is received in the tool holding unit 12 with the flange 52 in abutment with the end of the tool holding unit 12, the groove 55 is aligned with the balls 41 so that the balls 41 can be received in the groove 55 when the locking sleeve 39 is in the position shown in FIG. 1.

The base of the bore in the outer member 50 is formed with an axially extending square-cross section bore 56 arranged to have driving connection with the corresponding cross-section extension of a tap held by the adaptor and the junction between the square cross-section bore 56 and the main bore provides a shoulder against which seats a compression spring 57 which acts against the inner end of the inner member 51 to bias this outwardly of the bore in the outer member 50. The wall of the bore of the outer member 50 is formed with a circumferential groove 58 and the inner member has three circumferentially spaced through bores formed in the wall thereof and each of these through bores is of reducing diameter in the inward radial direction to retain a ball 59 therein. The diameters of the balls 59 are such that, when the inner member 51 is biased outwardly of the bore in the outer member 50, the balls 59 project radially inwardly of the wall of the inner member 51 whereas, when the balls 59 are aligned with the circumferentially groove 58, they are then free to move radially outwardly to an extent such that they do not project radially inwardly of the wall of the inner member 51.

A through-bore 60 is formed in the cylindrical wall of the inner member 51 and a radially extending pin 61 having one end secured to the outer member 50 is received in the bore 60 and, as can be seen from FIG. 6, the pin 61 is of substantially less diameter than the bore 60 and co-operation between the pin 61 and the surround of the bore 60 serves to limit the extent of relative axial displacement between the inner and outer members 50 and 51.

In order to insert the tap in the adaptor, the inner member 51 is moved axially relative to the outer member 50 so as to compress the spring 57 and so as to allow the balls 59 to move radially outwardly into the groove 58. The shank of the tap is then inserted into the bore of the inner member 51 and, when the inner member 51 is allowed to return to the position shown in FIG. 6 under the action of the spring 57, the balls 59 are urged radially inwardly into engagement with the shank of the tap so that the shank is then fast with the adaptor.

FIG. 2 shows an alternative form of adaptor which may be used in place of that shown in FIGS. 6 and 7 and the adaptor shown in FIG. 2 is described in detail in co-pending U.S. application Ser. No. 184,410 filed September 28, 1971, and now Pat. No. 3,727,432, to which reference should be had for a detailed explanation of the operation thereof.

Briefly the adaptor shown in FIG. 2 includes an outer member 62 having a bore in which an inner member 63 of identical construction to the inner member 51 of the adaptor shown in FIGS. 6 and 7 is received and is acted on by a spring 64 with the construction and mode of operation of the inner member to grip a tap as described above in relation to FIGS. 6 and 7.

The outer member 62 is formed with an axial extension 65 having a bore therein which accommodates an axially movable plunger 66 and the plunger comprises a rod 67 and a head 68 which includes a portion 69 of double frusto-conical conformation. The bore in the extension 65 is closed at its end remote from the inner member 63 by an externally screw-threaded collar 70 which has a through bore to receive the rod 67 and which abuts an annular washer 71. The annular washer 71 provides a seating for spring means constituted by a plurality of Belleville washers 72 which surround the rod 67 and act between the washer 71 and the head 68 of the plunger 66. The Belleville washers 72 are arranged so that they bias the plunger 66 axially towards the inner member 63 and the biasing force exerted by the Belleville washers 72 can be adjusted by rotating the collar 70 in the appropriate sense. Intermediate its ends the outer member 62 is formed with four equiangularly spaced through bores in each of which a pair of radially aligned balls 73 are positioned. The innermost of each pair of balls 73 is arranged to bear against the double frusto-conical portion 69 of the head 68 and the outermost of each pair of balls 73 is arranged to project beyond the outer surface of the outer member 62 into a groove formed in a sleeve 74 which fits on the outer member 62 and which is held against axial movement relative thereto by engagement of a circlet 75 in aligned circumferential grooves in the outer surface of the outer member 62 and in the inner surface of the sleeve 74.

The sleeve 74 has four longitudinal grooves to receive the outermost balls 73, the grooves in the sleeve 74 being spaced 90° apart corresponding to the angular spacing between the pairs of balls 73.

The adaptor shown in FIG. 2 is formed, at the end remote from the inner member 63, with a circumferential groove 76 which, when the adaptor is inserted into the tool holding unit 12 of the chuck, receives the balls 41 to hold the adaptor relative to the chuck. The sleeve 74 is formed with a pair of diametrically opposed recesses 77 which are arranged to receive the lugs 54 of the tool holder unit 12 when the adaptor is inserted into the tool holding unit to bring the balls 41 thereof into the groove 76. Drive is transmitted by the lugs 54 to the sleeve 74 of the adaptor and then by the balls 73 to the outlet member 62 of the adaptor and from there to the shank of the tap which has a square cross-section portion which fits in a square cross-section bore 78 of the inner member 62.

The tranmsission of drive between the sleeve 74 and the outer member 62 is dependant on the engagement of the balls 73 in the longitudinal grooves in the sleeve 74 so that, when the torque transmitted between the sleeve 74 and the inner member 62 exceeds a certain value determined by the biasing force exerted by the Belleville washers 72 on the plunger 66 and the outermost ball of each pair of balls 73 unseats from the longitudinal groove in the sleeve 74, slipping will take place between the sleeve 74 and the inner member 62. The value of the torque at which slipping takes place can be set by adjusting the position of the collar 70 and this torque-limiting facility of the adaptor enables the drive to a tap held within the inner member 63 to be disengaged when the torque experienced by the tap exceeds a predetermined value. Breakage of the tap held within the inner member 63 under torque overload conditions is thus avoided.

This torque-limiting facility is particularly advantageous when the tap is being used to tap a previously drilled blind bore for, when the tap bottoms in the blind bore, the outer member 62 of the adaptor can then slip relative to the tool holding unit 12 and, as soon as the rotational drive is reversed by reversing rotation of the drive spindle of the drilling machine, the outermost balls 73 will seat in the grooves in the sleeve 74 thereby reconnecting drive to the tap so that it can be withdrawn. As the balls 73 will tend to roll when the sleeve 73 slips relative to the outer member 62, there will be very little wear even when the tapping tool has to be bottomed during the tapping of each of a large number of blind bores. Reference should be had to co-pending application Ser. No. 184,410 filed September 28, 1971 and now Pat. No. 3,727,432, for a more detailed discussion of the mode of operation of the adaptor shown in FIG. 2.

As the spring 26 is contained entirely within the bore 25 in the shank 10 and as the compound slide unit 17 is housed entirely within the body 11, the particular arrangement of the parts of the tapping chuck is such as to enable the diameter thereof to be reduced so far as possible whilst maintaining the required strength characteristics for the various parts of the chuck. The telescoping connection between the shank 10 and the body 11 permits the tap to move axially relative to the driving spindle of the machine tool so that it is not necessary that the rate of rotation of the spindle should be accurately correlated with the rate of feed thereof.

The compound slide unit 17 provides for limited radial displacement of the axis of the tap relative to the axis of the driving spindle of the machine tool so that a limited degree of misalignment between the axis of the spindle and the axis of a bore to be tapped can be allowed for.

What we claim then is :

1. A chuck comprising a tool holding unit, a body, a driving element comprising a shank telescopically mounted relative to said body, and having a sliding key connection between the body to drivingly connect the shank to said body and to permit relative axial sliding movement from an "at rest" position in each of two opposite axial directions, a resilient biassing means housed entirely within and axially located in the shank and operative between the body and the driving element to restrain said axial sliding movement of the body relative to the driving element in each of said directions, a means for transmitting drive from the body to the tool holding unit said means comprising a compound slide unit including a first element drivingly connected to the tool holding unit, a second element drivingly connected to the body and a third element intermediate the first and second said elements having tongue and groove connections to transmit drive, and arranged in such a way as to permit limited radial movement of the tool holding unit relative to the driving shank in a pair of mutually transverse directions.

2. A chuck according to claim 1 wherein the elements of the compound slide unit are housed entirely within the body.

3. A chuck according to claim 2 wherein the third element receives a formation projecting axially from the second element in a recess therein, the projecting formation affording a seat for a spring loaded ball for locating the second element relative to the first element.

4. A chuck according to claim 3 wherein the third element has a pair of mutually orthogonal radial grooves formed therein, one groove receiving a tongue formation on the first element and the other groove constituting said recess and receiving a tongue constituting said projecting formation on the second element.

5. A chuck according to claim 1 wherein the biassing means is a compression spring carried by an axially extending spindle received within the axial bore of the shank, the spring being arranged to bear against abutments formed within the shank and the spring being under compression regardless of the direction of relative axial movement between the spindle and shank.

6. A chuck according to claim 3, in which the biasing means is a compression spring surrounding an axially extending spindle received in the bore of the shank and in which the spindle includes a portion received in a bore in the second element and secured to said second element.

7. A chuck according to claim 6 in which a blind bore is formed in the first element and receives a compression spring which provides the spring loading for the ball which locates the second element relative to the first element.

8. A chuck according to claim 1 wherein the tool holding unit receives an adaptor having means for transmitting drive to a tool held by the adaptor, the adaptor including means for limiting the torque transmitted between the tool holding unit and the tool.

* * * * *